Sept. 13, 1932.  L. E. GRAVES ET AL  1,876,663

CABLE TAP

Filed Aug. 28, 1929

INVENTORS
L.E. GRAVES
W.J. EDELMANN

BY  Hazard and Miller

ATTORNEYS

Patented Sept. 13, 1932

1,876,663

UNITED STATES PATENT OFFICE

LOUIS E. GRAVES AND WILLIAM J. EDELMANN, OF LOS ANGELES, CALIFORNIA

CABLE TAP

Application filed August 28, 1929. Serial No. 388,977.

Our invention relates to improved means for coupling branch wires to main conducting wires or cables.

An object of the invention is the provision of a coupling device which is an improvement over that of our copending application, Serial No. 188,719, filed May 4, 1927.

A more detailed object is the provision of a cable tap, whereby a tap cable may be electrically connected to a main cable in such a manner as to establish a highly efficient electrical connection between the main and tap cables, and still which requires no soldering.

A further object is the provision of a highly efficient electrical conductor as described, which is also capable of establishing excellent mechanical connection between the two cables; with the result that liability of the connection's being broken, is practically eliminated, even though forces of considerable magnitude be imposed upon either or both of the cables, tending to sever the connection therebetween.

A further object is the provision of a cable tapping device in the form of a substantially U-shaped strap adapted to partially encircle the main cable, and to receive between the extended ends thereof, a primary and a secondary presser block, and which is also provided with means common to both blocks for pressing them into tight mechanical, and highly efficient electrical contact with a main cable and a tap cable respectively. It is in this latter respect that the device of the present invention, differs principally from the tapping device of our co-pending application referred to hereinabove.

Another object is the provision of an electrical conductor tapping device, whereby either one or more tap cables or wires may be connected to a main cable or wire.

The invention possesses other objects and advantageous features, some of which, with those enumerated, will be set forth in the following description of the invention's particular embodiment which is illustrated in the drawing accompanying and forming a part of the specification.

Referring to the drawing.

Figure 1:
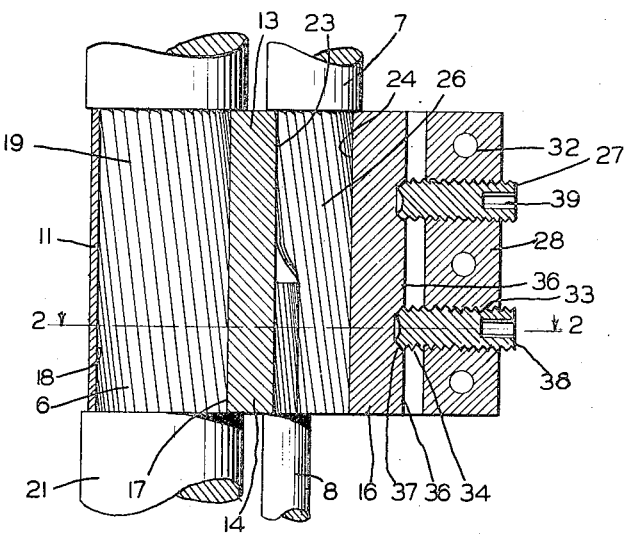
Figure 1 is a vertical, medial, transverse sectional view of a cable tap embodying the principles of our invention.
Figure 2:
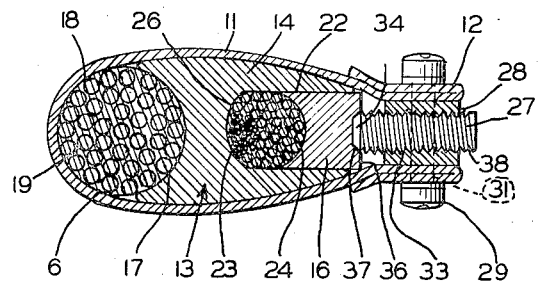
Fig. 2 is a horizontal sectional view taken upon the line 2—2 of Fig. 1, with the direction of view as indicated.

Specifically describing the invention in the most practical embodiment thereof of which we are at present aware, Figs. 1 and 2 disclose a cable tap mounted upon a main cable 6, and establishing mechanical and electrical connection between the main cable 6 and a pair of tap cables 7 and 8. The device includes a strap 11 formed of suitable conductive material, and is of such characteristics that it is relatively easily bendable. This strap 11 is of suitable width, and is bent to substantially U-shape configuration, as best shown upon Fig. 2. The ends 12 of the strap are doubled back to provide portions of double thickness, and may be welded or soldered to the body of the strap if desired, to develop greater strength of the entire structure.

A core 13 is cooperatively associated with the U-shaped strap 11, and is composed of a primary presser block 14, and a secondary presser block 16. The primary presser block 14 is provided on its inner face with a recess 17 which is arcuate in cross section and preferably substantially semi-circular. Furthermore, the radius of curvature of the recess 17 is preferably substantially the same as that of the inner face 18 of the bent portion of the U-shaped strap 11; with the result that the two surfaces 17 and 18 cooperate to define a substantially cylindrical space within which a portion 19 of the main cable 6, which has been stripped of insulation, may be received—it being understood that the main cable 19 is provided with insulation 21. Obviously, however, the tapping device of our invention, will operate fully as efficiently in connection with cables which are not insulated.

A relatively deep recess 22 is formed in the outer face of the primary presser block 13. The bottom 23 of the recess 22, is arcuate, as is the inner face 24 of the secondary presser block 16, which is slidably received within the recess 22. Consequently, the arcuate surfaces 23 and 24 also cooperate to define a substantially cylindrical space for the reception of a bared portion 26 of one or more tap cables 7 and/or 8.

Both presser blocks 14 and 16 are pressed into firm engagement with their respective cables, by means of preferably a plurality of set screws 27. Consequently, we have provided thrust means whereby the set screws 27 are suitably carried by the ends 12 of the U-shaped strap 11. In the embodiment of the invention shown upon Figs. 1 and 2, this thrust means takes the form of a bar 28 rigidly and detachably connected to the doubled ends 12 of the strap 11, through the expedient of a plurality of screws 29 or their equivalent, extending through clearance holes 31 in the ends 12, and threaded into tapped holes 32 in the bar 28. The set screws 27 are threaded through tapped holes 33 which extend through the bar 28 at right angles to the holes 32, so that the inner ends 34 of the set screws 27, engage the outer face 36 of the secondary presser block 16, suitable recesses 37 being formed in the outer face 36 within which the associated ends 34 of the set screws 27 are adapted to seat. The outer ends 38 of the set screws 27, are accessible from the outside of the bar 28, and are provided with suitable means such as non-circular recesses 39 within which a suitable wrench may be engaged, whereby the set screws 27 may be tightened or loosened.

It will be observed that the cylindrical space defined by the arcuate faces 23 and 24 of the primary and secondary presser blocks 14 and 16 respectively, extends throughout the entire width of both presser blocks 14 and 16; with the result that a tap cable or similar conductor may extend from each end of the tapping device. These tap cables may be of the same, or different cross sectional areas, or the device may be employed for connecting a single tap cable to the main cable, if desired.

The device is installed by first baring a section 19 of the main cable 6, preferably so proportioning the bared portion 19, that it corresponds in length to the width of the tapping device, thus resulting in a neater finished connection than if the insulation 21 of the cable 6, were removed from the wire over a greater length thereof than that to be covered by the tapping device. The strap 11 is then disposed upon the cable 6, so as to partially encircle the bared portion 19, with the ends 12 of the strap extending laterally therefrom. This may be effected by removing the screws 29 whereby one of the ends 12 is attached to the bar 28. The strap 11, being capable of being bent, may then be spread sufficiently to permit the bared portion 19 of the cable 6, to pass between this released end 12 and the bar 28. The primary presser block 14 should then be inserted between the extended portions of the strap 11, by slipping the block 14 thereinto through one end. The tapped cables 7 and 8 (or only one of them if a single tap cable is to be employed) are then inserted into the recess 22; and the secondary presser block 16 is also slipped into the recess. It is obvious that the tap cables and the presser block 16, may be inserted into the recess 22 before the loosened end 12 of the strap 11, is reattached to the bar 28; or, they may be positioned therein after re-engagement has been effected, provided the set screws 27 have first been retracted sufficiently. However, regardless of the particular sequence of steps in this connection, after the parts have been thus assembled, both presser blocks 14 and 16 may be pressed firmly into engagement with their respective cables 6 and 7, and/or 8, by tightening the set screws 27. Obviously, the force exerted by the set screws 27, presses the presser block 16 inwards against the tap cable or cables 7 and 8, pressing them against the bottom 23 of the recess 22; with the result that the primary presser block is forced inwards with equal pressure against the main cable 6. Also, it is obvious that the bent portion 18 of the strap 11 is pulled into tight engagement with the opposite side of the cable 6 from that engaged by the block 14.

Thus it may be seen that we have provided a tapping device whereby one or more tap cables may be so connected to a main cable, without the necessity of any soldering or welding process, that a highly efficient electrical contact is established therebetween, and furthermore, a good mechanical connection is established, preventing disturbance of the electrical connection, should any considerable force be imposed upon either or both cables, tending to sever the connection therebetween. Moreover, the device is of extremely simple nature, and hence of relatively low cost, and may be installed in such a manner as to yield a joint of extremely high efficiency, both electrical and mechanical, within an extremely short space of time.

Figures 3, 4:
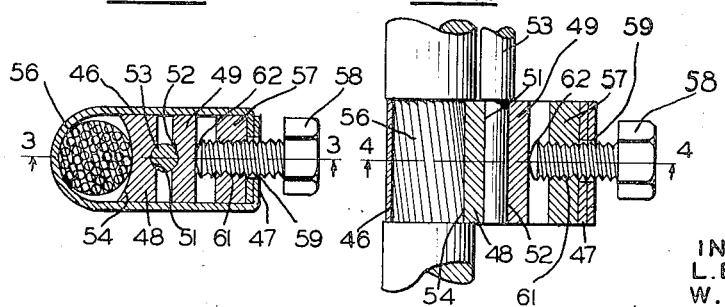
Fig. 3 is a vertical, medial, transverse sectional view of a slightly modified form of a cable tap incorporating the principles of our invention. The plane of section is indicated by the line 3—3 of Fig. 4, and the direction of view by the arrows.
Fig. 4 is a horizontal sectional view taken upon the line 4—4 of Fig. 3, with the direction of view indicated by the arrows.

Referring now to Figs. 3 and 4, a slightly modified form of tapping device is disclosed. This modification of the invention is particularly adaptable for use in connection with relatively small cables or other conductors. While essentially of similar characteristics to the modification previously described, it varies slightly therefrom, in that the U-shaped strap 46 has its ends 47 bent toward each other and disposed in overlapping relationship, thus providing end flanges. Receivable between the extended portions of the strap 46, is a primary presser block 48, and a secondary presser block 49. However, instead of being guided within a recess in the primary presser block 48, the secondary presser block 49 slidably engages the extended portions of the strip 46 itself. Recesses 51 and 52 are formed in the proximal faces of the blocks 48 and 49 respectively, for the accommodation of the tap wire 53; and the inner face 54 of the primary presser block 48, is rounded to provide better contact with the main cable 56. A bar 57 is disposed between the extended portions of the strap 46, and is retained against displacement therefrom laterally in respect to the cable 56, by contact with the innermost of the flanges 47. One or more set screws 58 extend through clearance holes 59 in the flanges 47, and are threaded through a tapped hole 61 in the bar 57, so that the inner end 62 of the set screw 58, engages the outer face of the secondary presser block 49. It may thus be readily understood that by tightening the set screw 58, both presser blocks 48 and 49 may be pressed into tight engagement with the main and tap cables or wires 56 and 52 respectively.

It is to be understood that the details of the invention as herein disclosed, are subject to alteration within the spirit or scope of the appended claims.

We claim:

1. A cable tap comprising in combination: a substantially U-shaped strap adapted to partially encircle a cable, a primary presser block slidably disposed between the extended ends of said strap and having a recess in its outer face adapted to receive a tap cable, a secondary presser block slidably disposed within said recess and engageable with said tap cable, thrust means adjacent the ends of said strap, means restraining said thrust means against displacement from the strap laterally in respect to said cables, and a screw threaded through said thrust means and engaging said secondary presser block to press both blocks into tight engagement with their respective cables.

2. A cable tap comprising in combination: a substantially U-shaped strap adapted to partially encircle a cable, a primary presser block slidably disposed between the extended ends of said strap and having a recess in its outer face adapted to receive a tap cable, a secondary presser block slidably disposed within said recess and engageable with said tap cable, a bar rigidly connected to the ends of said strap, and a screw threaded through said bar and engaging said secondary presser block to force both blocks into tight engagement with their respective cables.

3. A cable tap comprising in combination: a substantially U-shaped strap adapted to partially encircle a cable, a primary presser block slidably disposed between the extended ends of said strap and having a recess in its outer face adapted to receive a tap cable, a secondary presser block slidably disposed within said recess and engageable with said tap cable, a bar disposed between the ends of said strap, means for rigidly and removably attaching the bar to both of said ends, and a screw threaded through said bar and engaging said secondary presser block to force both blocks into tight engagement with their respective cables.

4. A cable tap comprising in combination: a bendable substantially U-shaped strap adapted to partially encircle a cable, a primary presser block slidably disposed between the extended ends of said strap and having a recess in its outer face adapted to receive a tap cable, a secondary presser block slidably disposed within said recess and engageable with said tap cable, a bar disposed between the ends of said strap, means for rigidly attaching said bar to both of said ends, the attaching means associated with at least one of the ends being disengageable, and a screw threaded through said bar and engaging said secondary presser block to press both blocks into tight engagement with their respective cables.

5. A cable tap comprising in combination: a substantially U-shaped strap adapted to partially encircle a main cable, a primary presser block slidably disposed between the extended ends of said strap and having a recess in its outer face, said recess extending throughout the length of the block and being adapted to receive a plurality of tap cables therein, a secondary presser block slidably disposed within said recess and engageable with a tap cable, and means carried by said strap for forcing both blocks into tight engagement with their respective cables.

6. A cable tap comprising in combination: a substantially U-shaped strap adapted to partially encircle a main cable, a primary presser block slidably disposed between the extended ends of said strap and having a recess in its outer face, said recess extending throughout the length of the block and being adapted to receive a plurality of tap cables therein, a secondary presser block slidably disposed within said recess and engageable with a tap cable, a bar rigidly connected to the ends of the strap, and a screw threaded through said bar and engaging said secondary presser block to press both blocks into tight engagement with their respective cables.

In testimony whereof we have signed our names to this specification.

LOUIS E. GRAVES.
WILLIAM J. EDELMANN.